US006338304B2

United States Patent
Yamamoto et al.

(10) Patent No.: US 6,338,304 B2
(45) Date of Patent: *Jan. 15, 2002

(54) BOILER

(75) Inventors: Kenji Yamamoto, Hitachinaka; Hironobu Kobayashi; Hirofumi Okazaki, both of Hitachi; Toshikazu Tsumura; Kenji Kiyama, both of Kure, all of (JP)

(73) Assignees: Hitachi, Ltd.; Babcock Hitachi Kabushiki Kaisha, both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,353

(22) Filed: Aug. 18, 1999

(30) Foreign Application Priority Data

Aug. 20, 1998 (JP) .......................................... 10-233685

(51) Int. Cl.[7] ................................................ F23C 1/10
(52) U.S. Cl. ...................... 110/261; 110/263; 110/345
(58) Field of Search ................................ 110/261, 263, 110/265, 262, 345, 347, 210, 214, 212, 297, 348, 185, 186, 188; 122/22, 211

(56) References Cited

U.S. PATENT DOCUMENTS

| 3,877,440 A | | 4/1975 | Winkin | |
|---|---|---|---|---|
| 5,020,454 A | * | 6/1991 | Hellewell et al. | 110/264 |
| 5,429,060 A | * | 7/1995 | Tokuda et al. | 110/263 |
| 5,505,146 A | * | 4/1996 | Laursen | 110/264 |
| 5,626,085 A | * | 5/1997 | Donais et al. | 110/188 |
| 5,809,913 A | * | 9/1998 | Kramer et al. | 110/347 |
| 5,908,003 A | * | 6/1999 | Hura et al. | 110/345 |
| 6,021,743 A | * | 2/2000 | Bauer | 122/4 D |
| 6,085,674 A | * | 7/2000 | Ashworth | 110/347 |

FOREIGN PATENT DOCUMENTS

| EP | 62131106 | 6/1987 |
|---|---|---|
| EP | 03286918 | 12/1991 |
| EP | 07098103 | 4/1995 |
| JP | 59-92346 | 6/1984 |
| JP | 62-131106 | 6/1987 |
| JP | 2-122909 | 10/1990 |
| JP | 3-286918 | 12/1991 |
| JP | 7-98103 | 4/1995 |
| WO | 98/16779 | 4/1998 |

* cited by examiner

*Primary Examiner*—Denise L. Esquivel
*Assistant Examiner*—K. B. Rinehart
(74) *Attorney, Agent, or Firm*—Mattingly, Stanger & Malur, P.C.

(57) ABSTRACT

A boiler has a combustion chamber formed by front and rear walls and a side wall extending between the front and rear walls. Plural stages of burners are placed on at least one of the front and rear walls. In the front and rear walls are opposing gas jets for making a pressure of the gas near the side wall within the combustion chamber higher than the pressure of the gas at a center portion of the combustion chamber. The gas jet ports are disposed at a height within a range of the height of the burner stages. The burner stages supply the pulverized coal, the air for transferring the pulverized coal and the air for burning. A part of the air for transferring the pulverized coal or the air for burning is supplied in a branched manner to the gas jet port and injected into the combustion chamber. Further, the air is preferably injected from the gas jet ports in a direct gas flow, not a swirling flow.

2 Claims, 11 Drawing Sheets

BOILER

BACKGROUND OF THE INVENTION

1. Field of the Invention

The present invention relates to a boiler, and more particularly, to a boiler which is preferable for reducing a concentration of CO, an unburned matter, an attached ash and the like near a side wall of a furnace.

2. Description of the Prior Art

In order to improve a heat efficiency of a boiler, it is necessary to reduce a concentration of a carbon monoxide (CO) and an unburned matter within a furnace. In order to reduce the concentration of CO and the unburned matter within the furnace, there has been known the following method.

A first method corresponds to a method of adjusting an operation condition, in particular, a method of adjusting an air flow amount in a burner and an air flow amount in an after air port for a two stage combustion.

A second method corresponds to a method of supplying an air to a space in which an unburned matter is increased. As an example of the second method, a method of supplying an air along a wall of a furnace is shown in Japanese Utility Model Unexamined Publication Nos. 59-92346 and 2-122909, and Japanese Patent Unexamined Publication Nos. 62-131106 and 3-286918.

Among these conventional examples, in Japanese Utility Model Unexamined Publication Nos. 59-92346 and 2-122909, and Japanese Patent Unexamined Publication No. 3-286918, there is disclosed a boiler in which an air port is provided in a lower portion of a burner stage.

In Japanese Patent Unexamined Publication No. 62-131106, there is disclosed a boiler in which the air ports are provided on four walls of the furnace and the air ports are provided on upper and lower portions and an intermediate height of a plurality of burner stages.

Inventors have verified an effectiveness of the conventional first and second methods mentioned above on the basis of a measurement and a numerical analysis of an actual boiler. As a result, it has become apparent that the concentration of CO and the unburned matter in the combustion gas have still been high near the side wall(s) extending between the front and rear wall having the burner walls having the burner(s), at least at a height of the burner stage, even when any of these methods is employed. Further, it has become apparent that the ash is attached to the side wall in the case of the burning of coal.

The reason is that the combustion gas generated from the burner comes near the side wall adjacent to the wall having the burner since the pressure near the side wall is lower than that of the combustion area at the center of the furnace.

A countermeasure thereof is shown in Japanese Patent Unexamined Publication No. 7-98103. In this example, there is suggested a boiler comprising a plurality of burners and a plurality of air inlet ports for a two stage combustion disposed downstream of the burners, which is structured such that an auxiliary combustion port for supplying a gas for combustion having an oxygen partial pressure of 10% or less is provided between a side wall of a furnace and a burner so as to adjust an injection amount of the gas for combustion injected from the auxiliary combustion port and a direction of a jet, thereby preventing a burner jet from returning to the side wall of the furnace.

However, in this prior art, a pipe for supplying the gas for combustion having the oxygen partial pressure of 10% or less to the auxiliary combustion port is required. Since it is necessary to arrange a pipe for supplying the gas for combustion having a length of about some tens of meters, a great cost increase can not be avoided.

SUMMARY OF THE INVENTION

An object of the present invention is to provide a boiler structured such as to prevent a combustion gas from coming near a side wall by using air, oxygen, combustion exhaust gas and the like.

The present invention provides a boiler comprising a combustion chamber formed by front and rear walls and a side wall between to said front and rear walls and a plural stages of burners placed on at least one of said front and rear walls, in which in order to make a pressure of a gas within said combustion chamber higher in a portion near the side wall than at a center portion of said combustion chamber, a gas port is provided between an outermost row burner and said side wall within a range of a height of said burner stages.

The present invention also provides a boiler comprising a combustion chamber formed by front and rear walls and a side wall between said front and rear walls and plural stages of burners placed on at least one of said front and rear walls, in which in order to make a pressure of a gas near said side wall within said combustion chamber higher than a pressure of a gas at a center portion of said combustion chamber, a gas jet port is provided in said side wall within a range of a height of said burner stages.

The present invention further provides a boiler comprising a combustion chamber formed by front and rear walls and a side wall between said front and rear walls, plural stages of burners placed on at least one of said front and rear walls and an after air port for two stage combustion disposed downstream of said burner stages, wherein at least one stage gas jet port for making a pressure of a gas near said side wall within said combustion chamber higher than a pressure of a gas at a center portion of said combustion chamber is provided between an outermost row burner and said side wall within a range of a height of said burner stages and plural stages of gas jet ports are provided between said lowermost stage burner and said after air port.

In each of the boilers mentioned above, it is desirable that said gas port is provided at portions of said opposing front and rear walls, said portions having the same height, and wherein gas supply means for injecting said jet at a speed at which a gas jet from said opposing gas port collides in the middle of said front and rear walls is provided.

The present invention, more particularly, provides a boiler as cited in any one of the structures mentioned above, comprising supply means for supplying a pulverized coal as a fuel and air for transferring said pulverized coal to said plural stages of burners, and supply means for supplying-an air for combustion to said plural stages of burners and supply means for supplying a gas for jetting to said gas port, in which there is provided control means for controlling a flow amount of the jet from said gas port on the basis of a load demand of said boiler and information of the coal type information so as to reduce a flow amount of the jet from said gas port when a load of said boiler is low and to increase the flow amount of the jet from said gas port when the load of said boiler becomes higher.

The present invention further provides a boiler as cited in any one of the structures mentioned above, comprising supply means for supplying a pulverized coal as a fuel and air for transferring said pulverized coal to said plural stages of burners, and supply means for supplying an air for combustion to said plural stages of burners and supply means for supplying a gas for jetting to said gas port, in which measurement means for measuring a concentration of a carbon monoxide (CO) in a combustion gas near said side wall is provided, and there is provided control means for controlling a flow amount of the jet from said gas port on the basis of the load demand of said boiler and a measured result of said concentration of CO so as to reduce the flow amount of the jet from said gas port when a load of said boiler is low, increase the flow amount of the jet from said gas port when the load of said boiler becomes higher and reduce a flow amount of the jet from said gas port when said concentration of CO is equal to or less than the predetermined value.

The control means may be means for increasing the flow amount of said jet in accordance with a decrease in the fuel ratio of the pulverized coal.

The supply means for supplying the gas for jetting to said gas port may be means for branching the air for combustion of said burner so as to make the air for jetting. In this case, it is preferable that a flow amount adjusting damper is provided in each of a flow passage of the air for combustion and a flow passage of the air for jetting.

The supply means for supplying the gas for jetting to said gas port may be means for branching the air for transferring said pulverized coal so as to make the air for jetting.

In the case that an after air port for a two stage combustion is placed downstream of said burner stage, the supply means for supplying the gas for jetting to said gas port can be means for branching the after air so as to make the air for jetting.

In accordance with the present invention, since in a boiler comprising a combustion chamber formed by front and rear walls and a side wall between said front and rear walls and plural stages of burners placed on at least one of said front and rear walls, in order to make a pressure of a gas within said combustion chamber higher in a portion near the side wall than at a center portion of said combustion chamber, a gas port is provided between an outermost row burner and said side wall within a range of a height of said burner stages, and it is possible to increase a pressure of the gas near the side wall so as to prevent the combustion gas from coming close to the side wall, thereby reducing an attachment of the ash due to a collision of the combustion gas, a concentration of CO at an outlet of the combustion chamber and an unburned matter.

In this case, in the embodiments which will be mentioned below, a boiler corresponds to a boiler in which a combustion gas generated by a combustion of a fuel flows from an inlet port of a fuel toward an outlet port of a furnace in one direction.

DESCRIPTION OF THE PREFERRED EMBODIMENTS

Next, embodiments of a once-through boiler in accordance with the present invention will be described below with reference to FIGS. 1 to 21.

Embodiment 1

Figure 1:
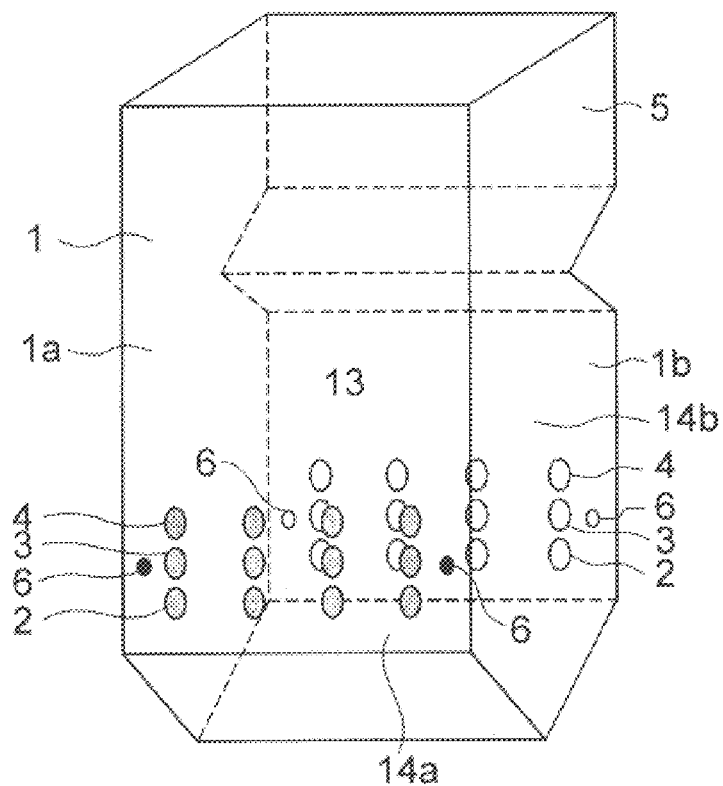
FIG. 1 is a perspective view which shows a summarized structure of a furnace in an embodiment 1 of a once-through boiler in accordance with the present invention.

FIG. 1 is a perspective view which shows a summarized structure of a furnace in an embodiment 1 of a once-through boiler in accordance with the present invention. The furnace has a front wall 14a and a rear wall 14b, and a left side wall 1a and a right side wall 1b crossing to or extending between the walls 14a and 14b. A plurality of burners are mounted to at least one of the opposing front wall 14a and rear wall 14b in plural stages and plural rows. In the case of the embodiment 1, a lower stage burner 2, a middle stage burner 3 and an upper stage burner 4 are respectively constituted by four rows of burners. Each of the burners supplies a fuel and an air for combustion to a combustion chamber 13.

A gas port 6 arranged by the present invention is positioned between the lower stage burner 2 and the upper stage burner 4 in a height direction and between a side wall 1 and an outermost row burner in a lateral direction. The gas port 6 in the embodiment 1 is formed at a portion having the same height as that of the middle stage burner 3. The gas port 6 of the front wall 14a and the gas port 6 of the rear wall 14b are formed at a position at which a jet of the gas port 6 collides.

In the embodiment 1, a gas not containing a fuel is supplied from the gas port 6. A component of the gas not containing the fuel includes air, oxygen, burned exhaust gas and the like. It is not necessary that flow speeds of the opposing jets are equal to each other, and it is possible to adjust the position at which the jets collide with each other and the pressure in the colliding position when changing the flow speed and the flow amount of the jets.

Figure 2:
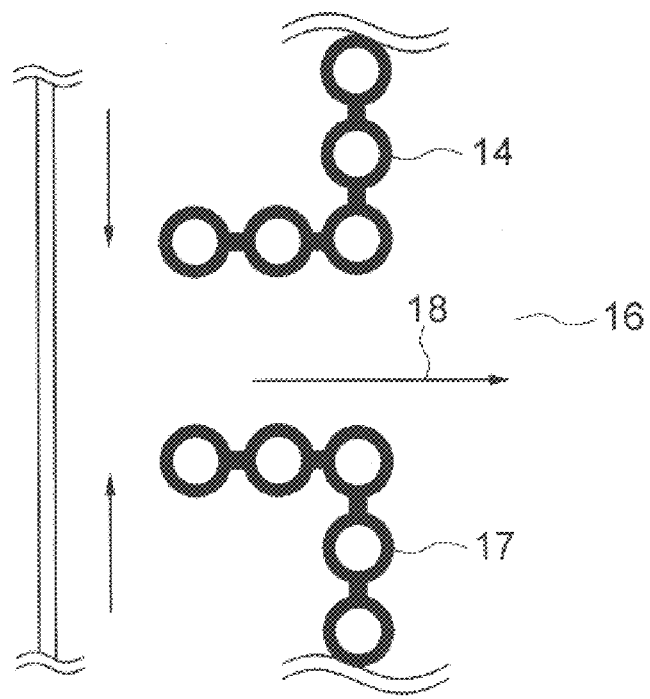
FIG. 2 is a cross sectional view which shows an embodiment of a structure of a gas port in the embodiment 1.
Figure 3:
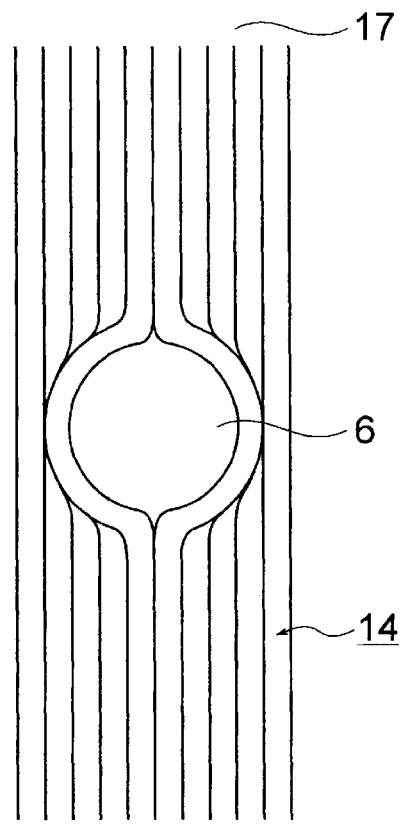
FIG. 3 is a front elevational view which shows an embodiment of a structure of the gas port in FIG. 2.

FIG. 2 is a cross sectional view which shows an embodiment of a structure of the gas port 6 in accordance with the embodiment 1. FIG. 3 is a front elevational view which shows the embodiment of the structure of the gas port 6 shown in FIG. 2. A shape of the gas port 6 is defined by a water tube 17 constituting a boiler. The water tube 17 is arranged around the gas port 6 in a direction parallel to a center axis of the gas port 6. When arranging the water tube 17 in this manner, a damping of a jet 18 in the gas port 6 is reduced so as to increase a pressure at a time when the jet 18 is collided. An optimum shape of the gas port 6 is a cylindrical shape in which a cross section is a circular shape. When the cross section of the gas port 6 is a circular shape, it is easy to bend the water tube 17 so as to form the gas port 6.

Figure 4:
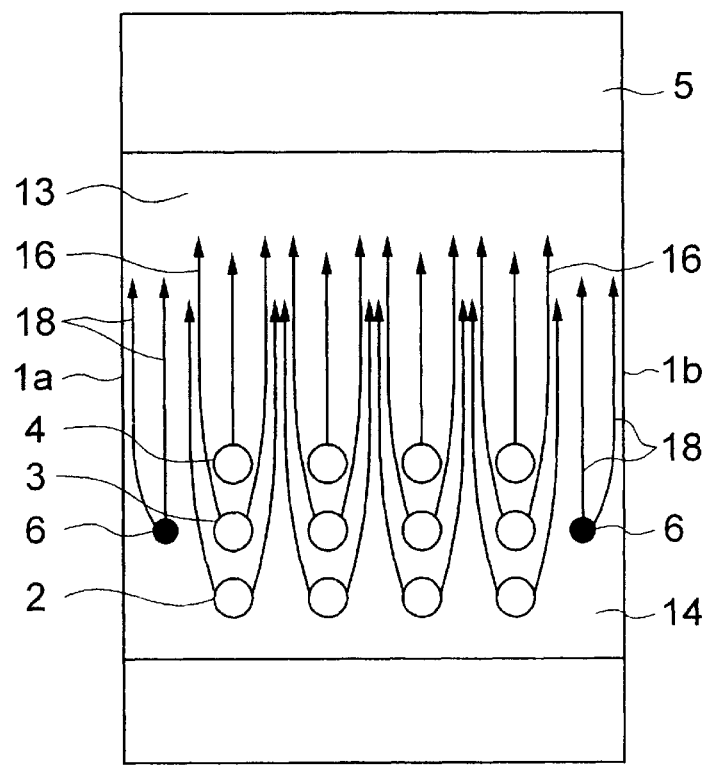
FIG. 4 is a view which shows a summary of a stream of a combustion gas and a gas jet within the furnace in the embodiment 1 in which the gas port is placed on a front wall and a rear wall.

FIG. 4 is a view which shows a summary of a stream of the combustion gas 16 and the jet 18 within the furnace of the embodiment 1 in which the gas port 6 is placed in the front wall 14a and the rear wall 14b. When placing the gas port 6, the combustion gas 16 can not come close to the side walls 1a and 1b due to the jet 18 of the gas injected from the gas port 6. Because the pressure near the side walls 1a and 1b becomes increased due to the jet 18 of the gas injected from the gas port 6.

Figure 5:
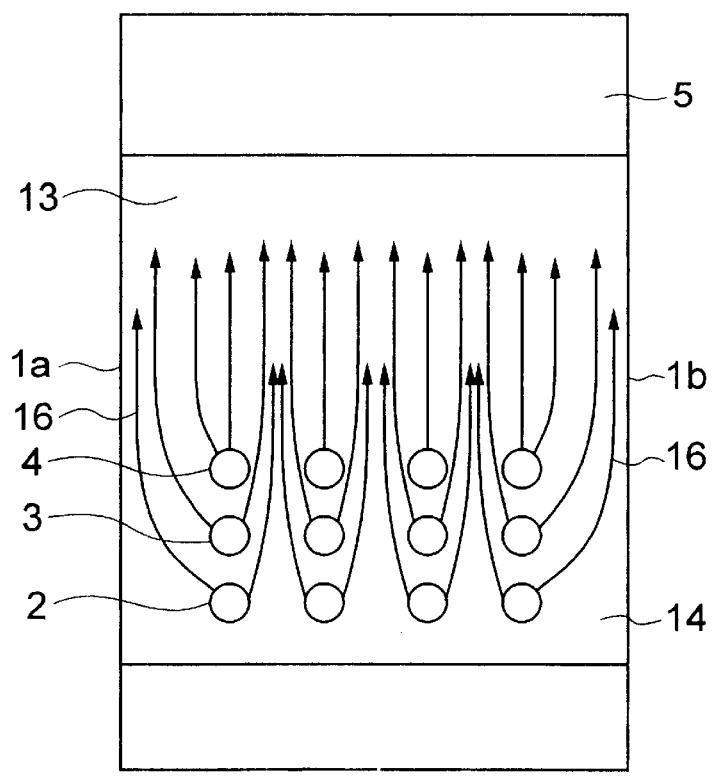
FIG. 5 is a front elevational view which shows a summary of a stream of the combustion gas in the conventional furnace in which the gas port is not placed.

FIG. 5 is a front elevational view which shows a summary of a stream of the combustion gas in the conventional furnace in which the gas port 6 is not placed. In the case that the gas port 6 is not placed, the combustion gas 16 formed by the burner stages 2, 3 and 4 flows in the direction of the side walls 1a and 1b. Since the combustion gas 16 from the lower stage burner 2 is prevented by the combustion gas 16 in the middle burner 3 and the upper burner 4 and can not ascend in an immediately upper direction, the gas 16 flows in a direction of the side walls 1a and 1b in which a pressure is low.

A certain effect can be obtained even when the gas port 6 is formed between a bottom of the furnace to a top thereof not immediately beside the burner stages 2, 3 and 4. However, the effect becomes small when it is placed at a portion apart from the burner stages 2, 3 and 4.

As shown in the prior art, when forming the gas port 6 in a lower side of the burner stages 2, 3 and 4, the pressure of the portion near the side wall 1 becomes high at the formed height, however, the pressure becomes low at the height of the burner stages 2, 3 and 4, so that the combustion gas 16 generated by the burners 2, 3 and 4 flows in a direction of the side walls 1a and 1b.

When forming the gas port 6 in an upper side of the burner stages 2, 3 and 4, the pressure of the portion near the side walls 1a and 1b is increased in comparison with the case that the gas port 6 is not formed. However, in comparison with the case of forming the gas port in the area of the burner stages 2, 3 and 4, an increase of the pressure is a little and the combustion gas 16 generated by the burners 2, 3 and 4 easily flows in a direction of the side walls 1a and 1b.

The jet 18 from the gas port 6 can achieve the object of the present invention well when reaching the center portion of each of the side walls 1a and 1b. In the case that the jet 18 can not reach the center portion of each of the side walls 1a and 1b, the combustion gas 16 easily flows in a direction of the side walls 1a and 1b. Accordingly, it is necessary to collide the jet 18 in the center portion of each of the side walls 1a and 1b. A desirable flow speed of the jet 18 is within a range between 30 m/s and 90 m/s. Further, in the case that the gas port 6 is of the type of supplying a direct flow gas, since it is possible to make the damping of momentum of the gas smaller than the type of supplying a swirling flow gas, it is possible to supply the gas to the center portion of the side walls 1a and 1b at a higher pressure.

The jet 18 at the gas port 6 maybe not only supplied in perpendicular to the burner wall 14 but also supplied at an optional angle. When supplying the jet 18 at the gas port 6 in such a manner as to direct to an inner portion of the combustion chamber 13, it is hard that the combustion gas 16 flows in a direction of the side wall 1. When injecting the jet 18 toward the side wall 1, the gas in the jet 18 can be supplied along the side wall 18. When the combustion gas 16 comes close to the side wall 1, a heat absorption of the side wall 1 is increased, so that a temperature of a water wall constituting the side wall 1 is increased. The jet 18 at the gas port 6 also serves to cool the side wall 1.

Embodiment 2

Figure 6:
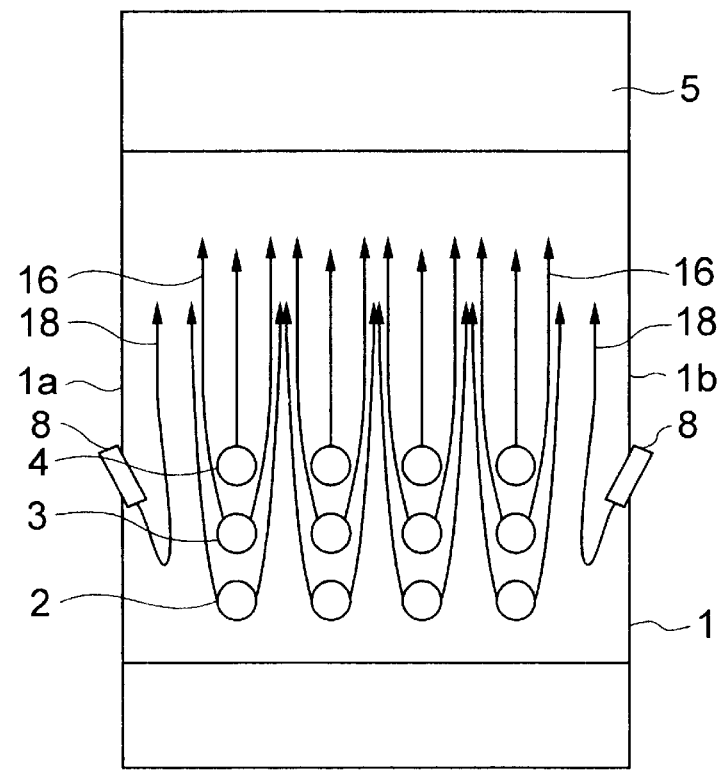
FIG. 6 is a view which shows a summary of a stream of a combustion gas and a gas jet within a furnace in accordance with an embodiment 2 in which a gas port is placed on a left side wall and a right side wall.

FIG. 6 is a view which shows a summary of a stream of the combustion gas 16 and the jet 18 within the furnace in accordance with an embodiment 2 in which a gas port 8 is placed on the left side wall 1a and the right side wall 1b. The structures of the burner stages 2, 3 and 4, the front wall 14a and the rear wall 14b are the same as those of the embodiment 1. It is not necessary that the gas port 8 is placed only on the front wall 14a and the rear wall 14b on which the burner stages 2, 3 and 4 are arranged. When the gas port 8 is placed on the side walls 1a and 1b, the same effect as that of the embodiment 1 can be obtained. In this case, as well as the embodiment 1, it is necessary to increase the pressure near the side walls 1a and 1b. It is proper to set a flow speed of the jet 18 to a range between 30 m/s and 90 m/s. Further, the jet 18 at the gas port 8 may be directed not only perpendicularly to the rear wall 14b but also at an optional angle. FIG. 6 shows an embodiment in which the jet 18 is supplied downward. When directing the jet 18 downward, the jet 18 and the combustion gas 16 are collided with each other, so that the pressure is increased. As a result, the combustion gas 16 can not come close to a direction of the side walls 1a and 1b.

Embodiment 3

Figure 7:
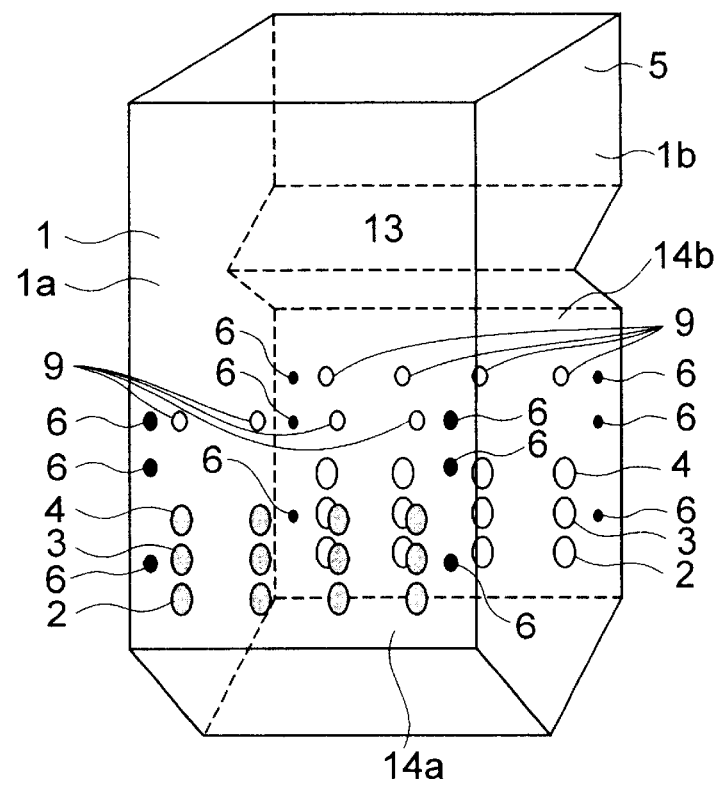
FIG. 7 is a perspective view which shows a summarized structure of a furnace in an embodiment 3 of a once-through boiler in accordance with the present invention.

FIG. 7 is a perspective view which shows a summarized structure of a furnace in an embodiment 3 of a once-through boiler in accordance with the present invention. The structures of the burner stages 2, 3 and 4, the front wall 14a and the rear wall 14b are the same as those of the embodiment 1. An after air port 9 for a two stage combustion is mounted to an upper portion of the burner stages 2, 3 and 4. At least one stage of gas port 6 is placed between the lower stage burner 2 and the upper stage burner 4, and plural stages of gas ports 6 are placed between the lower stage burner and the after air port 9. In the embodiment 3, they are mounted at a portion having the same height as that of the middle burner 3, between the upper burner 4 and the after air port 9 and a portion having the same height as that of the after air port 9.

The jet 18 from the gas port 6 increases the pressure at the center portion of the side wall 1 and prevents the combustion gas 16 from coming close to the side wall 1, as in the same manner as that of the embodiment 1. When placing the gas port 6 in the burner stages 2, 3 and 4, it is hard that the combustion gas 16 comes close to the side walls 1a and 1b and at the same time the deoxidization gas generated in accordance with a two stage combustion method is oxidized, so that it is possible to reduce the concentration of CO and the unburned matter near the side wall 1a and 1b. Further, the pressure near the side walls 1a and 1b is increased by placing a plural stages of gas ports 6 as shown in FIG. 7, so that it is hard that the combustion gas 16 containing the deoxidization gas comes close to the side wall 1.

Figure 8:
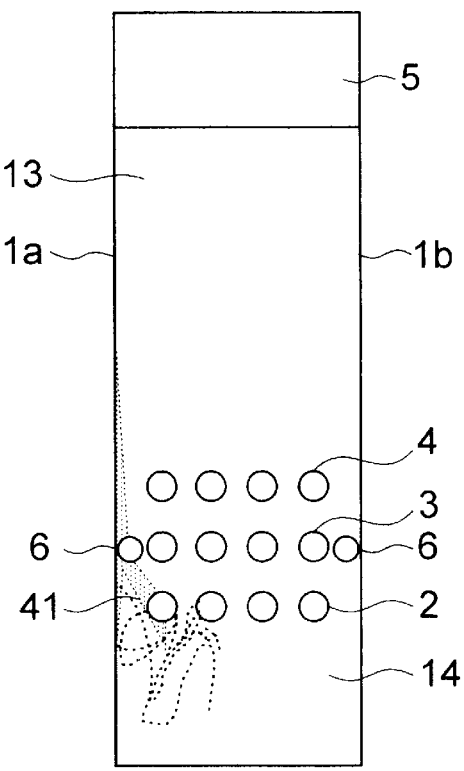
FIG. 8 is a front elevational view which shows a stream line toward a direction of the left side wall in the embodiment 3.
Figure 9:
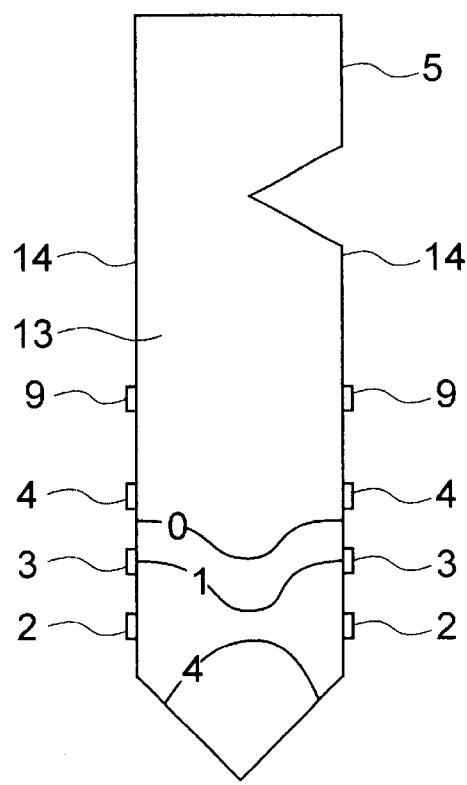
FIG. 9 is a view which shows a result of calculating a concentration of CO (%) at a position 10 cm apart from the left side wall of the embodiment 3.

FIG. 8 is a front elevational view which shows a stream line 41 toward a direction of the left side wall 1a in the embodiment 3. FIG. 9 is a view which shows a result of calculating a concentration of CO (%) at a position of 10 cm apart from the left side wall 1a in the embodiment 1. The numerically analyzed boiler is a boiler having a maximum output power of a pulverized coal flame of 500 MW and under a state of 100% load. 4% air for combustion is supplied from the gas port 6. An injection speed is 40 m/s.

Figure 10:
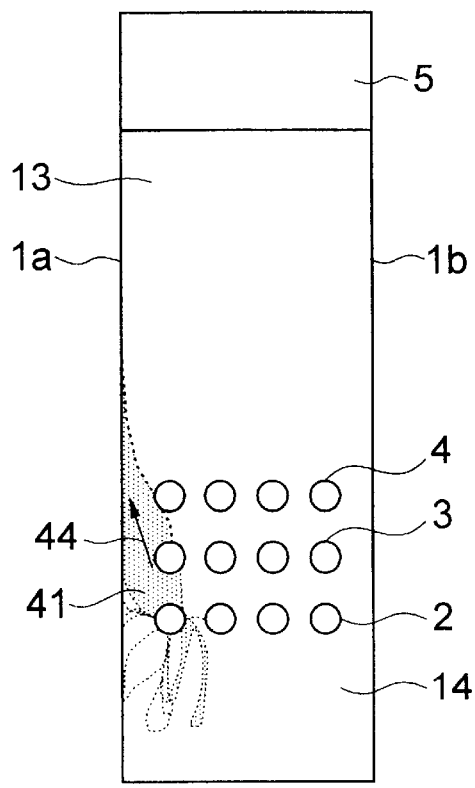
FIG. 10 is a front elevational view which shows a stream line toward a direction of the left side wall in the conventional once-through boiler.
Figure 11:
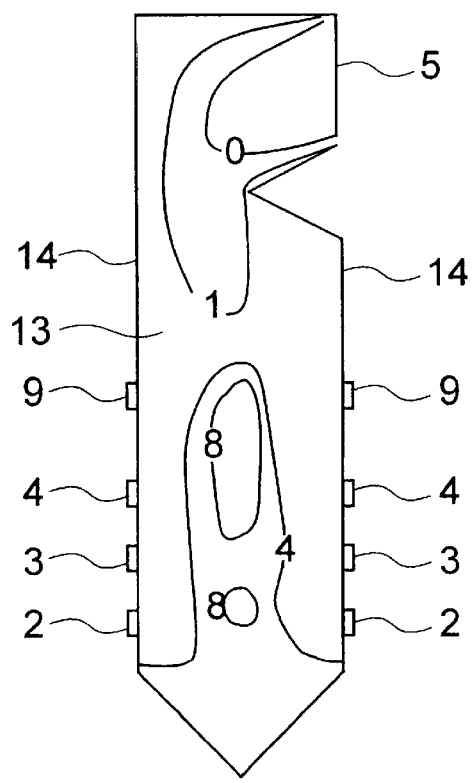
FIG. 11 is a view which shows a result of calculating a concentration of CO (%) at a position 10 cm apart from the left side wall shown in FIG. 10.

FIG. 10 is a front elevational view which shows the stream line 41 toward a direction of the left side wall 1a in the conventional once-through boiler. FIG. 11 is a view which shows a result of calculating a concentration of CO (%) at a position of 10 cm apart from the left side wall 1a shown in FIG. 10. The numerically analyzed boiler is a boiler having a maximum output power of a pulverized coal flame of 500 MW and under a state of 100% load.

Figure 12:
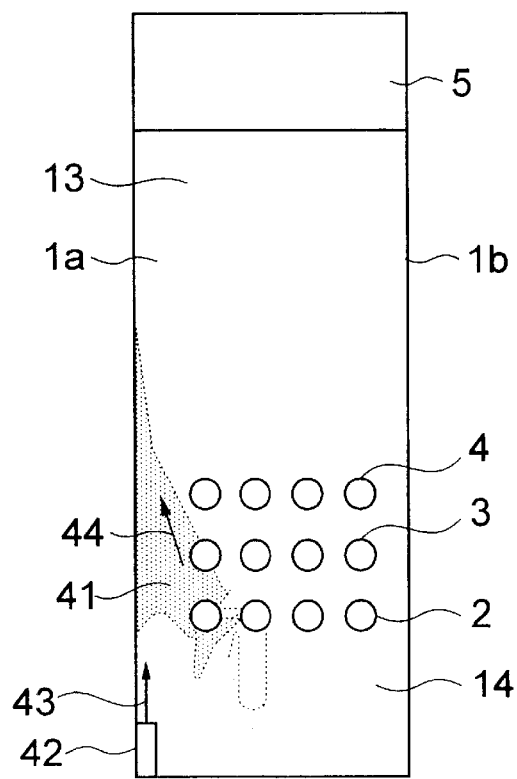
FIG. 12 is a front elevational view which shows a stream line toward a direction of the left side wall in the conventional once-through boiler in which an apparatus of an air flowed near boundary layer of wall for forming a stream of an air along the wall is provided at a lower portion of the furnace.
Figure 13:
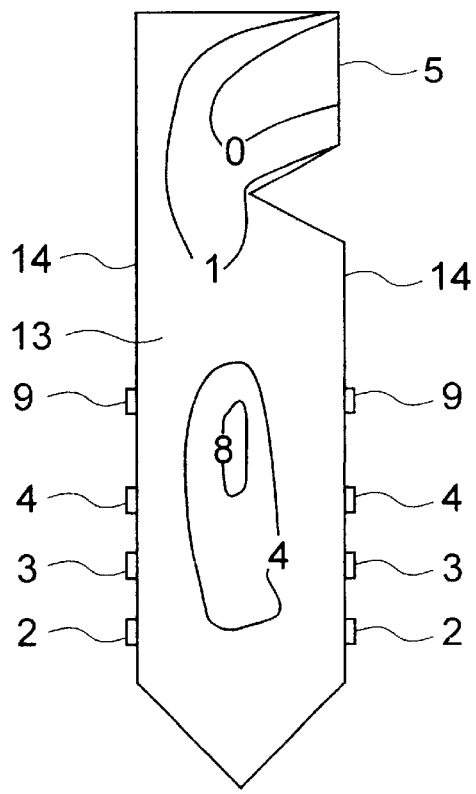
FIG. 13 is a view which shows a result of calculating a concentration of CO (%) at a position 10 cm apart from the left side wall shown in FIG. 12.

FIG. 12 is a front elevational view which shows a stream line 41 toward a direction of the left side wall 1a in the conventional once-through boiler in which an apparatus of an air flowed near boundary layer of wall 42 for forming an air flow along the wall is provided in the lower portion of the furnace. FIG. 13 is a view which shows a result of calculating a concentration of CO (%) at a position of 10 cm apart from the left side wall 1a shown in FIG. 12. The numerically analyzed boiler is a boiler having a maximum output power of a pulverized coal flame of 500 MW and under a state of 100% load. 8% air for combustion is supplied from the apparatus of an air flowed near boundary layer of wall 42 shown in FIG. 12 as an air flowed near boundary layer of wall 43.

In comparison among FIGS. 8, 10 and 12, in the case that the gas port 6 is provided in such a manner as shown in FIG. 8 on the basis of the embodiment 1 of the present invention, the flow of the combustion gas 16 toward a direction of the side walls 1a and 1b is less than the conventional embodiment shown in FIG. 12. In particular, there hardly exists the stream toward a direction of the side walls 1a and 1b from the middle stage burner 3 and the upper stage burner 4. The jet 18 from the gas port 6 prevents the combustion gas 16 from colliding with the side wall. In the case that the apparatus of an air flowed near boundary layer of wall 42 shown in FIG. 12 is provided, it is hardly possible to prevent the combustion gas 16 from colliding with the side walls 1a and 1b.

A concentration of CO near the side wall 1 in the embodiment 1 in accordance with the present invention shown in FIG. 9 becomes equal to or less than 1% at a portion downstream the burner stage.

A concentration of CO near the side wall 1 in the conventional type boiler shown in FIG. 11 attains 10% at the maximum between the upper stage burner 4 and the after air port 9. Carbon monoxide near the side wall 1 is hard to be oxidized and flows to the outlet port 5 of the furnace.

A concentration of CO near the side wall 1 in the conventional type boiler in which the air flowed near boundary layer of wall 42 shown in FIG. 13 is placed is 8% at the maximum, and is hardly different from that of the conventional type boiler. The distribution of the concentration of CO mentioned above is established because the combustion gas 16 flowing from the burners 2, 3 and 4 flows in a direction of the side wall 1 having a low pressure even after flowing the air flowed near boundary layer of wall 42 along the side wall 1, thereby colliding with the side wall 1.

Figure 14:
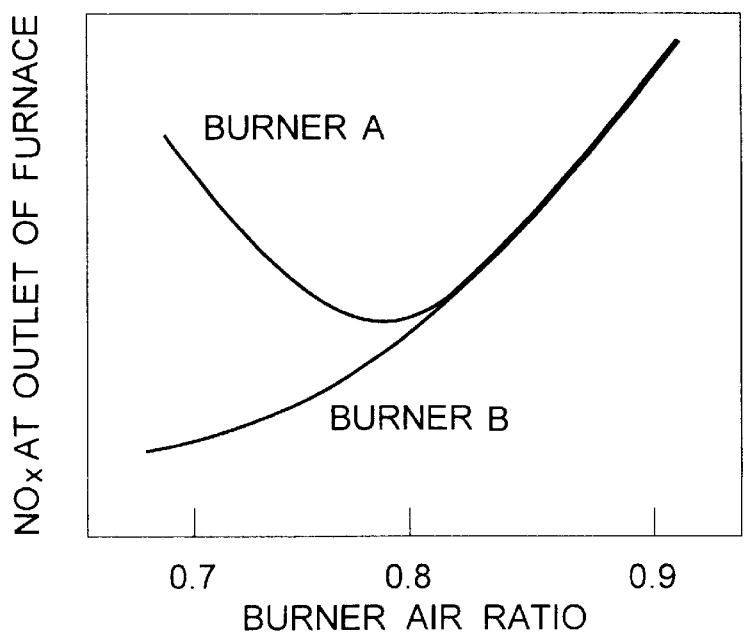
FIG. 14 is a view which shows a comparison of characteristic between a burner A in which a stoichiometric ratio is near 0.8 and a value of Nitrogen Oxide at the outlet of the furnace becomes a minimum value and a burner B in which a stoichiometric ratio is near 0.7 and a value of Nitrogen Oxide at the outlet of the furnace becomes a minimum value.

FIG. 14 is a view which shows a comparison of characteristic between a burner A in which a stoichiometric ratio of fuel is near 0.8 and a value of Nitrogen Oxide at the outlet 5 of the furnace becomes a minimum value and a burner B in which a stoichiometric ratio of burner is near 0.7 and a value of Nitrogen Oxide at the outlet 5 of the furnace becomes a minimum value. It is desirable that the burner used in the embodiment 3 has a characteristic that a value of Nitrogen Oxide at the outlet 5 of the furnace becomes a minimum value under an operation condition such that a stoichiometric ratio of burner is lower than 0.8. When using the burner B, in order to reduce Nitrogen Oxide at the outlet 5 of the furnace, it is effective to reduce the stoichiometric ratio of 0.7 rather than 0.8. However, when lowering the stoichiometric ratio of, the deoxidization gas generated in the burner stages 2, 3 and 4 flows near the side wall 1, thereby increasing the concentration of CO and the unburned matter.

Accordingly, the conventional type boiler has been operated under a condition of the stoichiometric ratio of about 0.8, and Nitrogen Oxide at the outlet 5 of the furnace has been substantially the same between the burner A and the burner B.

On the contrary, in accordance with the present invention, for example, since it is possible to reduce the concentration of CO and the unburned matter near the side wall 1 when placing the gas port 6 as shown in the embodiment 3, it is possible to use the burner B in which the stoichiometric ratio is near 0.7 and a value of Nitrogen Oxide at the outlet 5 of the furnace becomes a minimum value, so that in comparison with the case of using the burner A, it is possible to reduce Nitrogen Oxide at the outlet S of the furnace.

Embodiment 4

Figure 15:
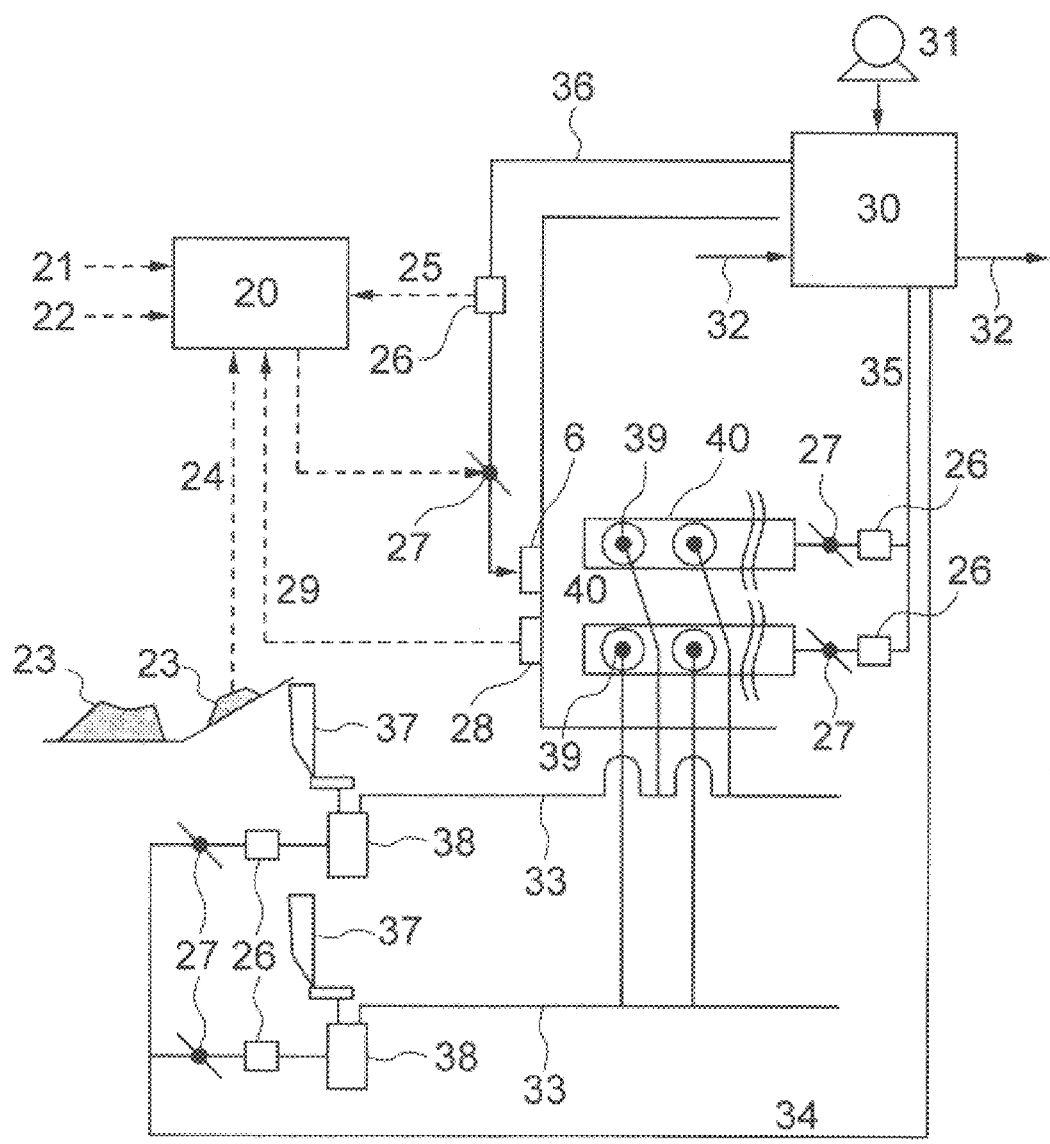
FIG. 15 is a systematic view which shows a structure of an embodiment 4 of a once-through boiler in accordance with the present invention.

FIG. 15 is a systematic view which shows a structure of an embodiment 4 of a once-through boiler in accordance with the present invention. A used fuel is a coal 23 and is stored in a coal bunker 37. A coal stored in the coal bunker 37 is pulverized by a coal pulverizer 38. A coal feeding air 33 and the coal are supplied to a burner 39. An air supplied from a blower 31 is heated by a burned exhaust gas 32 and an air heater 30. The heated air is separated into a coal feeding air 34, an air for combustion 35 and an air for jet 36 at the gas port 6. A damper 27 and a flow amount meter 26 are placed in pipes for the coal feeding air 34, the air for combustion 35 and the air for jet 36. A control apparatus 20 inputs a load demand 21, a coal type information 22, a coal type measuring result 24 and a flow amount signal 25 of the air for jet 36 so as to control a damper 27 of the air for jet 36. It is sufficient that the gas port 6 is placed in such a manner as shown in the embodiment 1 or the embodiment 2.

The control apparatus 20 estimates a characteristic of the coal on the basis of the coal type information 22 or the coal type measuring result 24, controls an opening degree of the damper 27 in response to the estimated coal characteristic, the load demand and the flow amount 25 of the air for jet 36, and adjusts a jet 18 from the gas port 6.

Figure 16:
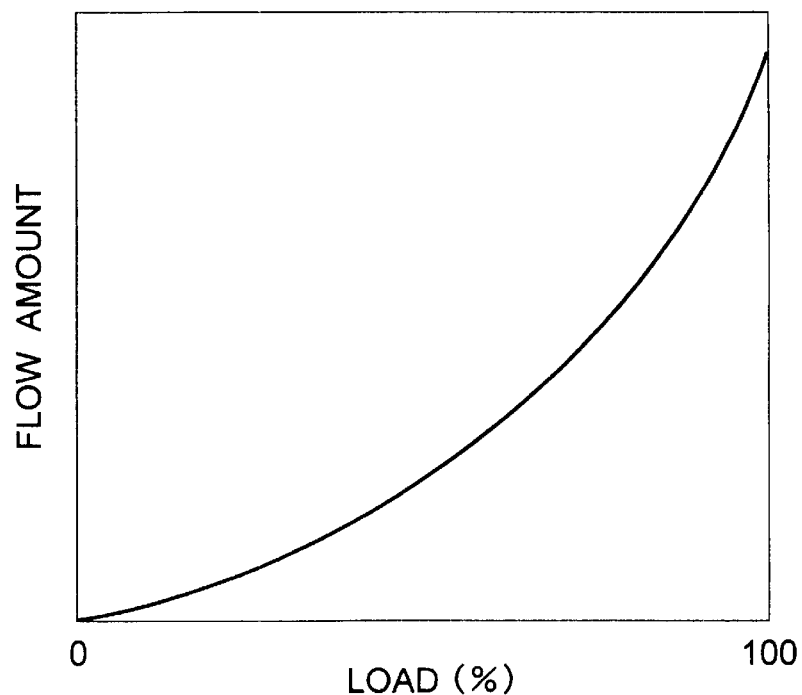
FIG. 16 is a characteristic view which shows an embodiment of a relation between a load and a flow amount of a jet from the gas port.

FIG. 16 is a characteristic view which shows an example of a relation between the load and the flow amount of the jet 18 from the gas port 6. Since the pressure of the combustion area within the furnace is not high when the load is low, a flow amount of the combustion gas 16 flowing in a direction of the side wall 1 is a little. Accordingly, the flow amount of the jet 18 from the gas port 6 is set to be a little. As the load becomes higher, the flow mount of the jet 18 from the gas port 6 is set to be increased.

Figure 17:
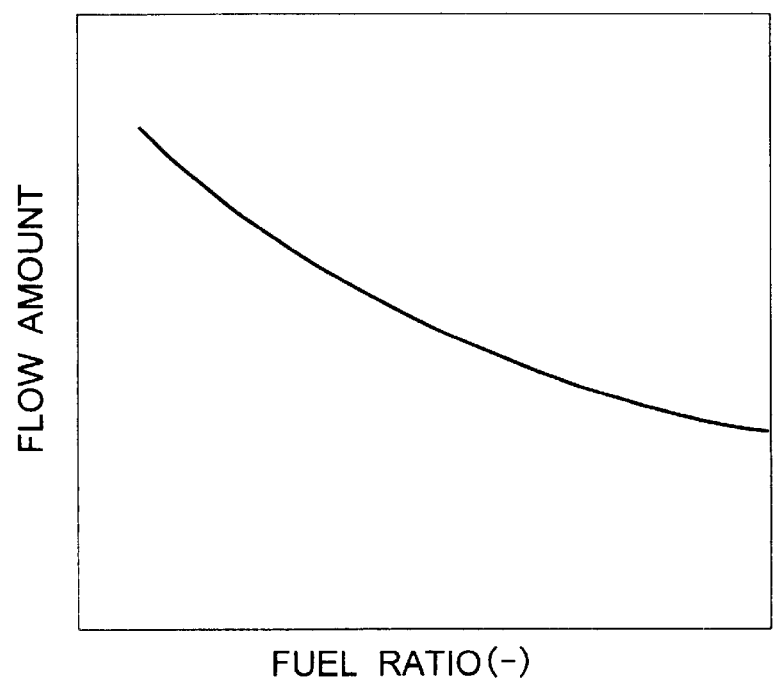
FIG. 17 is a characteristic view which shows an embodiment of a relation between a fuel ratio and a flow amount of a jet from the gas port.

FIG. 17 is a characteristic view which shows an example of a relation between a fuel ratio and the flow amount of the jet 18 from the gas port 6. In the case of a coal having a low fuel ratio, since an amount of a deoxidization gas in the combustion gas 16 flowing in a direction of the side wall 1 is increased, the flow amount of the jet 18 from the gas port 6 is set to be increased. On the contrary, in the case of a coal having a high fuel ratio, since a combustion is not promoted and the amount of the deoxidization gas is reduced in comparison with the coal having a low fuel ratio, the flow amount of the jet 18 from the gas port 6 is set to be reduced.

When setting the flow amount of the jet 18 at the gas port 6 to be minimum without breaking the deoxidization area formed within the furnace in accordance with the control method shown in FIGS. 16 or 17, it is possible to maintain a concentration of Nitrogen Oxide at the outlet 5 of the furnace to be always minimum.

Figure 18:
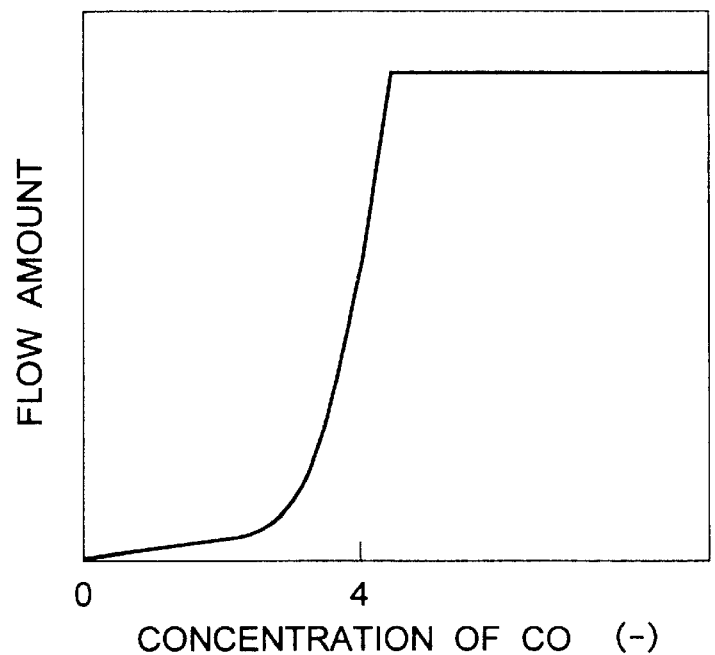
FIG. 18 is a characteristic view which shows an embodiment of a relation between a concentration of CO and a flow amount of a jet from the gas port.

FIG. 18 is a characteristic view which shows an example of a relation between the concentration of CO and the flow amount of the jet 18 from the gas port 6. Without the coal information 22 or the coal type measurement result 24, it is possible to mount a CO concentration measuring apparatus 28 to, for example, the side wall 1 so as to take into a CO concentration signal 29 and control the flow amount of the jet 18 from the gas port 6 in accordance with the concentration of CO. In this case, when the CO concentration signal 29 is equal to or more than about 4% as shown in FIG. 18, the damper 27 is opened so as to increase the flow amount of the jet 18 at the gas port 6. In the case that the concentration of CO 29 is equal to or less than 4%, the damper 27 is closed so as to reduce the flow amount of the jet 18 at the gas port 6. As is apparent from the distribution of the concentration of CO shown in FIG. 9 mentioned above, it is not necessary to limit the concentration of CO for starting the control to 4%. That is, when the concentration of CO is equal to or less than 4% near the burners 2, 3 and 4, it is considered that a flame does not collide with the side wall 11 so that it is possible to select an optional concentration of CO between 0 and 4%.

Embodiment 5

Figure 19:
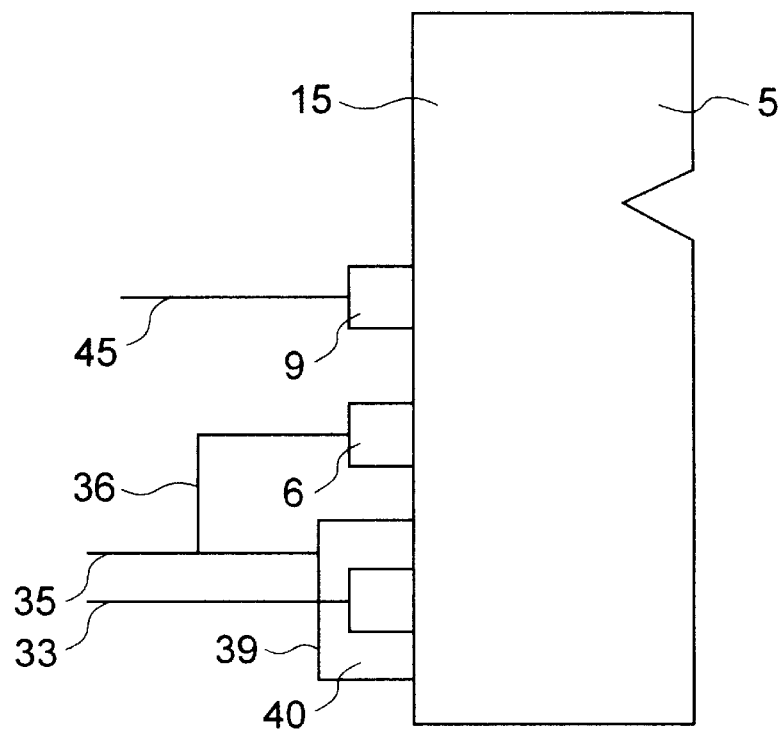
FIG. 19 is a side elevational view of a furnace which shows supply means for supplying an air for jet by branching an air for combustion in a burner.
Figure 20:
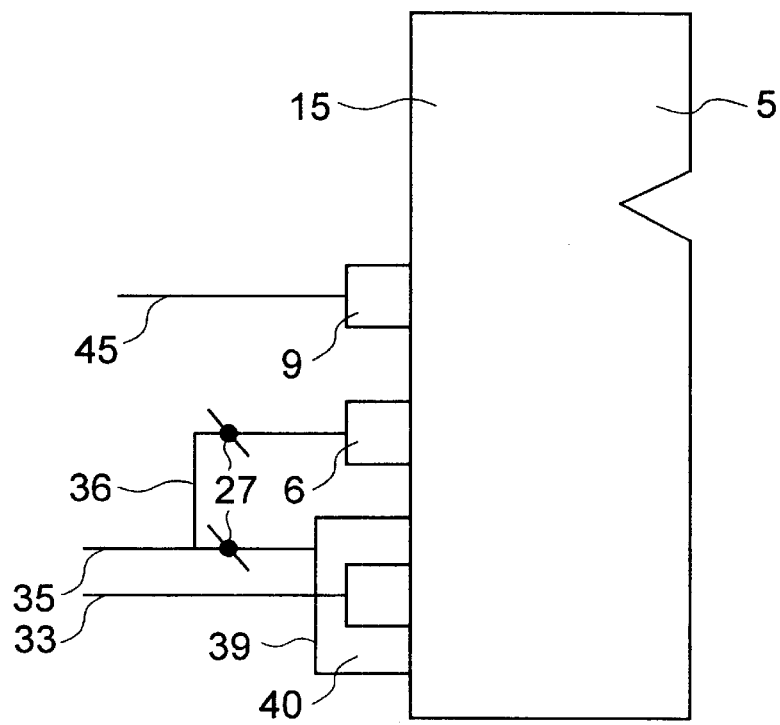
FIG. 20 is a side elevational view of a furnace which shows supply means for supplying an air for jet by branching from an upstream of a damper for adjusting an air flow amount in the burner.
Figure 21:
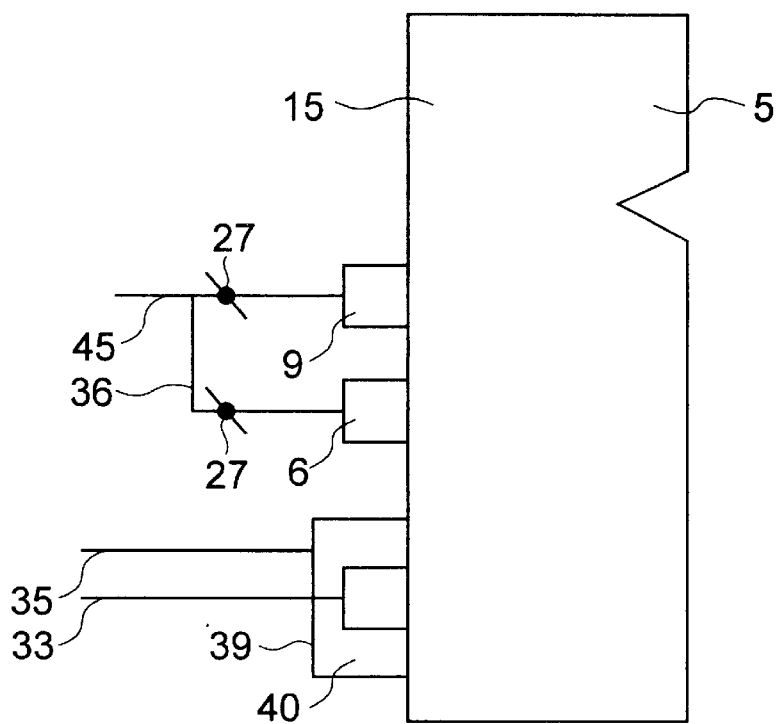
FIG. 21 is a side elevational view of a furnace which shows an embodiment in which in the case that the gas port is close to the after airport, the air for jet is branched from the after air and the air pipe is made shorter.

FIGS. 19, 20 and 21 are side elevational views which show variations of supply means for supplying the air for jet 36 to a furnace 15.

The air for jet 36 shown in FIG. 19 is supplied by branching the air for combustion 35 of the burner 39. Since the pressure of the air for combustion 35 of the burner is high, it is possible to inject the jet 18 at a high speed, so that it is preferable for increasing the pressure near the side wall 1.

The air for jet 36 shown in FIG. 20 is branched from an upstream of the damper 27 for adjusting the air flow amount of the burner 39. When branching the air for jet 36 in a manner mentioned above, the pressure of the air for jet 36 is a little changed even by changing the flow amount of the air for combustion to the burner 39, so that it is possible to inject the air for jet 36 at a further high speed. Further, it is possible to independently control the air for jet 36 and the air for combustion in the burner 39.

FIG. 21 shows an embodiment in which in the case that the gas port 6 is close to the after air port 9, the air for jet 36 is branched from the after air 45 and the air pipe is made shorter.

In the conventional embodiment disclosed in Japanese Patent Unexamined Publication No. 7-98103 mentioned above, the pipe for supplying the gas for combustion having an oxygen partial pressure of 10% or less to the auxiliary combustion port was necessary. Accordingly, it is necessary to arrange the pipe for supplying the gas for combustion having a length of some tens meters, so that a large cost increase was unavoidable.

On the contrary, in the supply means for supplying the air for jet 36 to the furnace 15 in accordance with the present invention as shown in FIGS. 19, 20 and 21, it is sufficient to only branch the air for combustion 35 or the after air 45 piped to a very near position so as to supply the air for jet 36. In particular, in the case that the gas port 6 is provided at the same height as that of the burner stages 2, 3 and 4, since it is possible to form the gas port 6 at both right and left ends of a window box 40 in the burner 39, it is sufficient to add only a minimum number of equipment for the present invention. In the case that the gas port 6 is provided at the same height as that of the after air port 9, the same matter can be also applied.

In accordance with the present invention, since in a once-through boiler comprising a combustion chamber formed by front and rear walls and a side wall crossing to said front and rear walls and a plural stages of burners placed on at least one of said front and rear walls, a gas port is provided between an outermost row burner and said side wall within a range of a height of said burner stages so as to inject a gas into the combustion chamber, thereby making a pressure of a gas near the side wall higher than a pressure of a gas at a center portion of the combustion chamber, it is possible to prevent the combustion gas from coming close to the side wall, thereby reducing an attachment of the ash due to a collision of the combustion gas, a concentration of CO at an outlet of the furnace and an unburned matter.

What is claimed is:

1. A boiler comprising:

a combustion chamber formed by front and rear walls and a side wall extending between said front and rear walls and plural stages of burners placed on at least one of said front and rear walls, at least one gas jet port in said at least one of said front and rear walls for making a pressure of a gas near said side wall within said combustion chamber higher than a pressure of a gas at a center portion of said combustion chamber, said at least one gas jet port being at a height within a range of a height of said burner stages;

opposing one s of said at least one gas jet port being provided in an opposing manner at the same height in the front and rear walls within the height range of the burners stages;

the burner stages including means for supplying pulverized coal as a fuel, air for transferring the pulverized coal and air for burning;

means for supplying a part of the air for burning in a branched manner to the gas jet port and for injecting said part of the air into the combustion chamber; and wherein the air is inject ed from the at least one gas jet port in a form of a direct flow.

2. A boiler as claimed in claim 1, further comprising said opposing ones of said at least one gas jet port being respectively provided at opposing portions of said front and rear walls, said opposing portions being at the same height, and gas supply means for supplying gas at a speed at which gas jets from said opposing gas ports collide midway between said front and rear walls.

* * * * *